US012583429B2

(12) United States Patent
Jeong

(10) Patent No.: US 12,583,429 B2
(45) Date of Patent: Mar. 24, 2026

(54) 3-WAY SOLENOID VALVE, BRAKE SYSTEM FOR VEHICLE INCLUDING THE SAME, AND CONTROLLING METHOD FOR THE SAME

(71) Applicant: HYUNDAI MOBIS CO., LTD., Seoul (KR)

(72) Inventor: Seung Hwan Jeong, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 1063 days.

(21) Appl. No.: 17/492,739

(22) Filed: Oct. 4, 2021

(65) Prior Publication Data

US 2022/0348179 A1 Nov. 3, 2022

(30) Foreign Application Priority Data

May 3, 2021 (KR) ......................... 10-2021-0057040

(51) Int. Cl.
*B60T 13/68* (2006.01)
*B60T 15/02* (2006.01)
(Continued)

(52) U.S. Cl.
CPC .......... *B60T 15/028* (2013.01); *B60T 13/686* (2013.01); *F16K 11/161* (2013.01); *B60T 8/3635* (2013.01); *B60T 13/62* (2013.01)

(58) Field of Classification Search
CPC ...... B60T 8/3635; B60T 8/364; B60T 13/686; B60T 13/62; B60T 15/028; F16K 11/161
(Continued)

(56) References Cited

U.S. PATENT DOCUMENTS 3,921,666 A * 11/1975 Leiber ..................... B60T 8/364
303/119.2
4,746,172 A * 5/1988 Gath ....................... B60T 8/445
303/119.2
(Continued)

FOREIGN PATENT DOCUMENTS

CN 1164209 A 11/1997
CN 101092138 A 12/2007
(Continued)

OTHER PUBLICATIONS

Office Action issued May 17, 2023 in corresponding Chinese Patent Application No. 202111087343.2.
(Continued)

*Primary Examiner* — Bradley T King
(74) *Attorney, Agent, or Firm* — NovoTechIP International PLLC

(57) ABSTRACT

A 3-way solenoid valve, a vehicle brake system including the 3-way solenoid valve, and a controlling method for the same are disclosed. The present disclosure in at least one embodiment provides a brake system for a vehicle, including one or more wheel cylinders configured to apply braking pressure to each of wheels of a vehicle by using hydraulic pressure, one or more of the 3-way solenoid valve configured to increase or decrease the hydraulic pressure supplied to the one or more wheel cylinders, and a braking device configured to supply the hydraulic pressure to the one or more wheel cylinders by using a stepping force applied to a brake pedal or driving of a hydraulic pump.

17 Claims, 13 Drawing Sheets

(51) Int. Cl.
    *F16K 11/16*      (2006.01)
    *B60T 8/36*       (2006.01)
    *B60T 13/62*     (2006.01)

(58) Field of Classification Search
    USPC ........................................................ 303/119.2
    See application file for complete search history.

(56)             References Cited

U.S. PATENT DOCUMENTS

| | | | | |
|---|---|---|---|---|
| 5,218,996 A | * | 6/1993 | Schmitt-Matzon ... | B60T 15/028 |
| | | | | 303/119.2 |
| 5,248,191 A | * | 9/1993 | Kondo .................... | B60T 8/172 |
| | | | | 303/119.2 |
| 5,567,023 A | * | 10/1996 | Yoo .......................... | B60T 8/364 |
| | | | | 303/119.2 |
| 5,609,400 A | * | 3/1997 | Hashida ................ | B60T 8/4275 |
| | | | | 303/119.2 |
| 5,618,087 A | | 4/1997 | You et al. | |
| 5,687,765 A | * | 11/1997 | You ........................ | B60T 15/028 |
| | | | | 303/119.2 |
| 5,752,750 A | * | 5/1998 | Lubischer ............. | B60T 8/5037 |
| | | | | 303/119.2 |
| 5,782,267 A | * | 7/1998 | Yoo ........................ | B60T 8/3635 |
| | | | | 137/596.17 |
| 5,921,281 A | * | 7/1999 | Takayama ............... | B60T 8/364 |
| | | | | 303/119.2 |
| 5,934,766 A | | 8/1999 | Feigel et al. | |
| 6,206,038 B1 | * | 3/2001 | Klein .................... | B60T 15/028 |
| | | | | 303/119.2 |
| 6,347,844 B1 | * | 2/2002 | Hosoya ................... | B60T 8/363 |
| | | | | 303/119.2 |
| 6,357,480 B1 | * | 3/2002 | Oyama ................. | B60T 8/3665 |
| | | | | 251/52 |
| 6,412,884 B1 | * | 7/2002 | Takayama ........... | F15B 13/0402 |
| | | | | 137/596.1 |
| 7,172,171 B2 | * | 2/2007 | Doehla ............... | F16K 31/0637 |
| | | | | 251/129.15 |
| 2007/0296270 A1 | | 12/2007 | Park et al. | |
| 2016/0207512 A1 | * | 7/2016 | Komaba ................. | B60T 7/042 |
| 2022/0212649 A1 | * | 7/2022 | Jeong ................. | F16K 31/0637 |
| 2023/0131725 A1 | * | 4/2023 | Jeong .................... | B60T 8/368 |
| | | | | 303/114.1 |

FOREIGN PATENT DOCUMENTS

| | | |
|---|---|---|
| JP | 08296759 A | 11/1996 |
| KR | 970011525 A | 3/1997 |
| WO | 9624515 A1 | 8/1996 |

OTHER PUBLICATIONS

Korean Office Action issued Feb. 20, 2023 in corresponding Korean Patent Application No. 10-2021-0057040.

\* cited by examiner

*100*

3-WAY SOLENOID VALVE, BRAKE SYSTEM FOR VEHICLE INCLUDING THE SAME, AND CONTROLLING METHOD FOR THE SAME

CROSS-REFERENCE TO RELATED APPLICATIONS

This application is based on, and claims priority from, Korean Patent Application Number 10-2021-0057040, filed May 3, 2021, the disclosure of which is incorporated by reference herein in its entirety.

BACKGROUND OF THE INVENTION

1. Field of the Invention

The present disclosure in some embodiments relates to a 3-way solenoid valve, a vehicle brake system including the 3-way solenoid valve, and a controlling method for the same.

2. Discussion of Related Art

The statements in this section merely provide background information related to the present disclosure and do not necessarily constitute prior art.

A conventional vehicle braking system is equipped with solenoid valves of the normally open type or those of a normally closed type. The normally open type of solenoid valve has the flow path normally opened upon receiving no electric current from a control unit. Whereas, the normally closed type of solenoid valve has the flow path normally closed upon receiving no electric current from a control unit.

A conventional vehicle braking system is equipped with those normally open type of solenoid valves and normally closed type of solenoid valves to supply hydraulic oil received from a braking device to wheel brakes.

FIG. 1 is a block diagram of a vehicle braking system according to the prior art.

As shown in FIG. 1, the hydraulic oil provided from a braking device 1 is supplied to inlet valves 3 and outlet valves 5. Here, the inlet valves 3 each are of the normally open type, and the outlet valves 5 each are of the normally closed type. Additionally, the inlet valve 3 is provided with a check valve 4 that allows one-way flow of the hydraulic oil from a wheel cylinder W1, W2, W3, or W4 toward the brake device 1. To depressurize the supplied hydraulic pressure in the wheel cylinder W1, W2, W3, or W4, the outlet valve 5 is opened to discharge the hydraulic oil from the wheel cylinder W1, W2, W3, or W4 toward the brake system 1.

In this way, the conventional braking system for a vehicle involves too many solenoid valves of the normally open type of inlet valves 3, the normally closed type of outlet valves 5, and the check valves 4 to be installed in full, resulting in undesirable manufacturing cost increase as well as volume and weight increase of the braking system.

BRIEF SUMMARY OF THE INVENTION

According to at least one embodiment, the present disclosure provides a 3-way solenoid valve including a valve block, an armature, a plunger, and a flow path control assembly. The valve block includes a valve chamber, a first fluid port in fluid communication with the valve chamber, a second fluid port, and a third fluid port. The armature is configured to produce an electromagnetic force due to a supplied current. The plunger has one end in contact with at least a portion of the armature and is configured to transmit, to an opposite end of the plunger, a depressing force due to the electromagnetic force of the armature. The body is disposed under the armature and has an interior configured to allow at least a portion of the plunger to pass through. The flow path control assembly includes a first opening/closing path configured to block or supply a flow of fluid between the first fluid port and the second fluid port, a second opening/closing path configured to block or supply a flow of fluid between the second fluid port and the third fluid port, and a first elastic part disposed within the flow path control assembly and configured to provide an elastic force in a direction in which the plunger exerts the depressing force, and flow path control assembly is configured to regulate opening and closing of the first opening/closing path and the second opening/closing path according to a magnitude of the depressing force of the plunger.

According to another embodiment, the present disclosure provides a brake system for a vehicle, including one or more wheel cylinders, one or more of the 3-way solenoid valve, and a braking device. One or more wheel cylinders is configured to apply braking pressure to each of the wheels of a vehicle by using hydraulic pressure. One or more of the 3-way solenoid valve is configured to increase or decrease the hydraulic pressure supplied to the one or more wheel cylinders. The braking device is configured to supply the hydraulic pressure to one or more wheel cylinders by using a stepping force applied to a brake pedal or driving a hydraulic pump.

According to yet another embodiment, the present disclosure provides a method of controlling a 3-way solenoid valve configured to control a flow of fluid in a vehicle between a pressurizing device, a wheel cylinder, and an accumulator, including determining whether there is a need to maintain, increase or decrease pressure in the wheel cylinder, producing an electromagnetic force by an armature in the 3-way solenoid valve to control the pressure in the wheel cylinder, and regulating opening and closing of a first opening/closing path that regulates the flow of fluid between the accumulator and the wheel cylinder and opening and closing of a second opening/closing path that regulates the flow of fluid between the wheel cylinder and the pressurizing device according to the electromagnetic force formed by the armature.

DETAILED DESCRIPTION OF THE INVENTION

Figure 1:
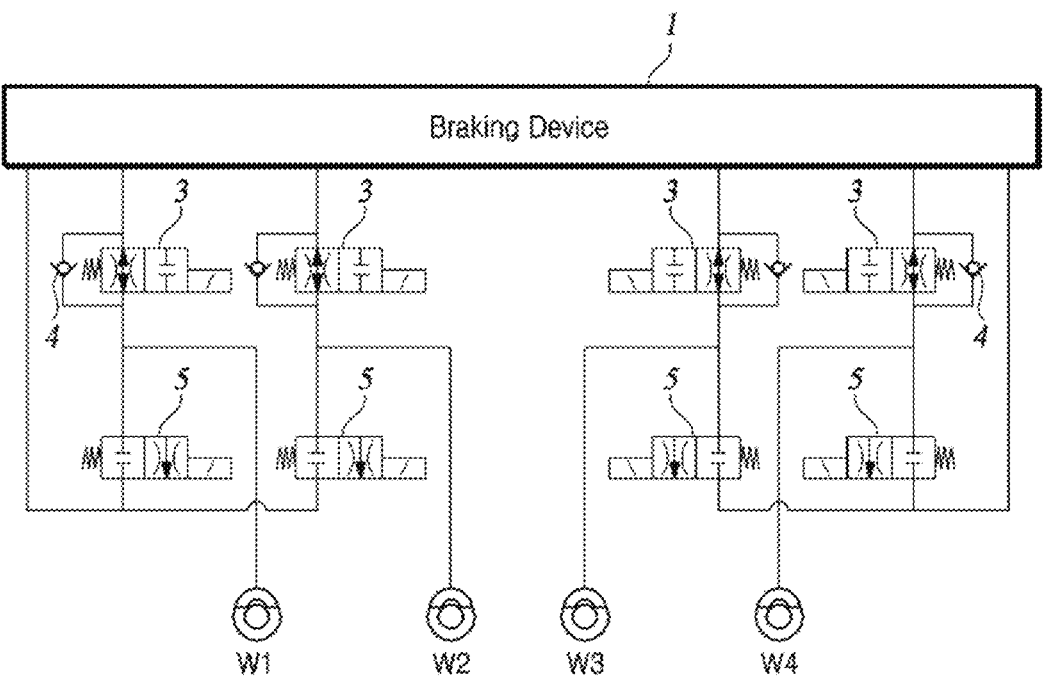
FIG. 1 is a block diagram of a vehicle braking system according to the prior art.

The present disclosure in at least one embodiment seeks to reduce the volume and weight of the vehicle braking system by reducing the number of solenoid valves to be incorporated.

Additionally, the present disclosure seeks to reduce the relevant manufacturing cost by replacing the inlet valve and the outlet valve with a 3-way solenoid valve.

The issues to be solved by the present disclosure are not limited to those mentioned above, and other unmentioned issues will be clearly understood by those skilled in the art from the following description.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

In the present specification, the terms 'left-hand side'/ 'right-hand side' or 'upper part'/'lower part' are merely used to indicate the directions in which certain elements are shown in the drawings, and the present disclosure is not limited to those illustrated orientations and positions.

Figure 2:
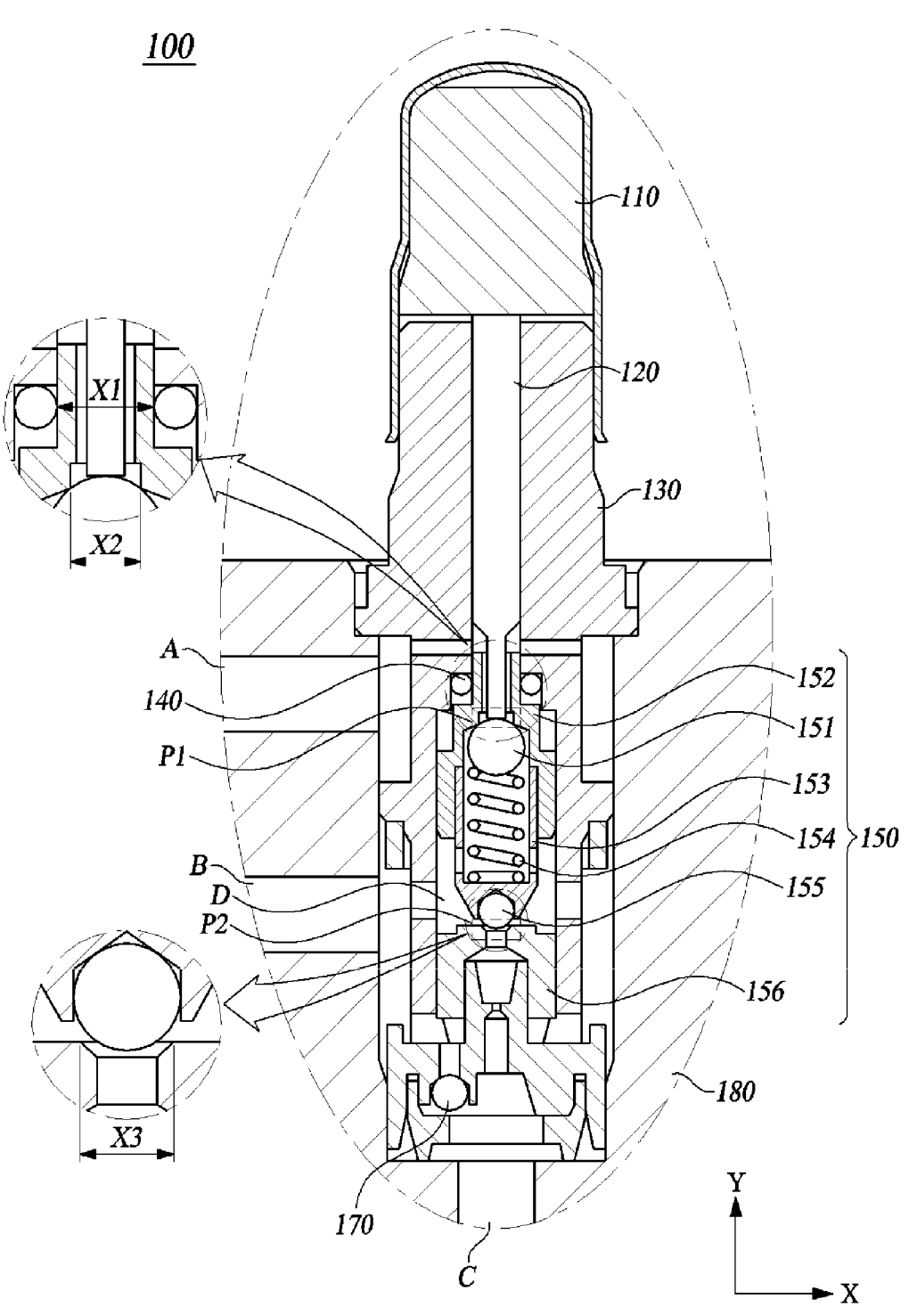
FIG. 2 is a cross-sectional view of a 3-way solenoid valve according to a first embodiment of the present disclosure.

FIG. 2 is a cross-sectional view of a 3-way solenoid valve according to a first embodiment of the present disclosure. In the present specification, the longitudinal direction of the 3-way solenoid valve is defined by the Y-axis, and the direction perpendicular to the longitudinal direction of the 3-way solenoid valve is defined by the X-axis. Among the directions shown in the drawing, an upward direction is defined as a 'positive Y-axis' and a downward direction is defined as a 'negative Y-axis'.

As shown in FIG. 2, the 3-way solenoid valve 100 according to the first embodiment includes all or some of an armature 110, a plunger 120, a body 130, a sealing member 140, a flow path control assembly 150, a check valve 170, and a valve block 180.

The armature 110 is configured to form an electromagnetic force in response to an electric current that is supplied. Specifically, the armature 110, which may be wrapped with a coil (not shown), forms an electromagnetic force by an electric current applied to the coil. The more electromagnetic force formed in the armature 110, the closer the armature 110 and the body 130 get to each other.

The body 130 is disposed under the armature 110 and has a hollow to be penetrated by at least a portion of the plunger 120. When an electromagnetic force is produced in the armature 110, the armature 110 produces a force to move toward the body 130.

The plunger 120 has one end in contact with at least a portion of the armature 110 and is configured to transmit an urging force toward the other end of the plunger 120 by the electromagnetic force of the armature 110. In other words, the plunger 120 is affected by the motion of the armature 110. The plunger 120 may be disposed to contact at least some of the armature 110, in particular, the center of the lower surface thereof.

The armature 110 formed with an electromagnetic force moves toward the body and depresses the plunger 120 in the negative Y-axis direction. The plunger 120 when depressed in the negative Y-axis direction accompanies an element of the flow path control assembly 150 linked with the other end of the plunger 120. In particular, a first flow control part 151 of the flow path control assembly 150 is depressed in the negative Y-direction.

The lower end of the plunger 120 may be arranged to penetrate a portion of the flow path control assembly 150. This arrangement allows the plunger 120 when depressed by the armature 110 to depress a first elastic part 154 disposed inside the flow path control assembly 150. The lower portion of the plunger 120 may have a smaller cross-sectional area than the upper portion of the plunger 120 to penetrate a portion of the flow path control assembly 150. Here, the cross-sectional area refers to the cross-sectional area of a plane perpendicular to the Y-axis.

The sealing member 140 is disposed between the flow path control assembly 150 and the body 130. The sealing member 140 closely surrounds the outer circumferential surface of a housing cover 152 of the flow path control assembly 150 and comes in close contact with the inner circumferential surface of the body 130, thereby preventing hydraulic fluid from flowing between the flow path control assembly 150 and the body 130. Accordingly, the hydraulic fluid may move through the space formed inside the flow path control assembly 150.

The flow path control assembly 150 includes all or some of the first flow control part 151, a housing 152, 153 made of the housing cover 152 and a housing bottom 153, the first elastic part 154, a second flow control part 155, and a valve seat 156.

The flow path control assembly 150 includes a first opening/closing path P1 configured to block or supply a flow of hydraulic fluid between a first fluid port A and a second fluid port B. The first opening/closing path P1 may be a space formed between an opening of the housing cover 152 and the first flow control part 151.

Further, the flow path control assembly 150 includes a second opening/closing path P2 configured to block or supply a flow of hydraulic fluid between the second fluid port B and a third fluid port C. The second opening/closing path P2 may be a space formed between a hollow of the valve seat 156 and the second flow control part 155.

The flow path control assembly 150 is configured to regulate the opening and closing of the first opening/closing path P1 and the second opening/closing path P2 according to the magnitude of the force applied by the plunger 120.

The first flow control part 151 opens and closes the first opening/closing path P1 and is in contact with one end of the first elastic part 154, and is disposed inside the flow path control assembly 150. The first flow control part 151 is disposed to be in contact with the lower end of the plunger 120.

The plunger 120 when depressed by the formation of electromagnetic force of the armature 110, in turn, depresses the first flow control part 151 in contact with the lower end of the plunger 120 in the negative Y-axis direction. With the lower end of the plunger 120 being contacted by the upper end of the first flow control part 151, the plunger 120 depresses the first flow control part 151 to transmit force to the first elastic unit 154. When the plunger 120 depresses the first flow control part 151 with a force sufficient to compress the first elastic part 154, the first opening/closing path P1 may be opened.

The first flow control part 151 may be formed into, but is not limited to, a sphere as shown in FIG. 2, and it may be formed otherwise as long as it can be arranged in the housing 152, 153 to close the first opening/closing path P1.

The housing 152, 153 is configured to move linearly in Y-axis direction in contact with the side in a valve chamber D. The housing 152, 153 is partially formed with penetration holes for allowing inflow of hydraulic fluid therein from outside of the housing 152, 153.

An orifice may be employed for the penetration hole. For example, depending on whether the 3-way solenoid valve 100 is used with the front wheel brake or the rear wheel brake of the vehicle to regulate the hydraulic pressure flowing therethrough, the orifice may be employed for the penetration hole with shape variations or omitted as appropriate.

The housing 152, 153 has an upper opening formed for allowing a portion of the plunger 120 to pass through. Hydraulic fluid may flow along the portion of the plunger 120 extending through the upper opening of the housing 152, 153. The housing 152, 153 may be composed of the housing cover 152 and the housing bottom 153 as shown in FIG. 2, but they may be integrally formed.

The first elastic part 154 may be disposed inside the housing 152, 153 and may have one end in contact with the first flow control part 151 and the other end in contact with the lower surface of the housing 152, 153. The first elastic part 154 may provide an elastic force in the same direction as the plunger 120 depresses.

The first elastic part 154, when depressed by the first flow control part 151 in the negative Y-direction, may depress the housing 152, 153 in the negative Y-axis direction.

The second flow control part 155 may be fixedly disposed at the outer lower end of the housing 152, 153. The second flow control part 155 is disposed at the lower end of the flow path control assembly 150 to open and close the second opening/closing path P2. The second flow control part 155 may be manufactured separately from the housing 152, 153 to be subsequently coupled therewith, but rather it may be manufactured through an integral injection with the housing 152, 153.

The valve seat 156 is disposed below the second flow control part 155 and is centrally formed with a hollow for allowing the hydraulic fluid to flow through. The valve seat 156 is fixedly disposed within the 3-way solenoid valve 100. While moving in the Y-axis direction from above the valve seat 156, the second flow control part 155 may regulate the opening and closing of the second opening/closing path P2.

The check valve 170 is configured to allow the hydraulic fluid to flow one way from the second fluid port B toward the third fluid port C. The check valve 170 may be disposed under the 3-way solenoid valve 100. In particular, when no electromagnetic force is produced in the armature 110 and the hydraulic fluid flows between the second fluid port B and the third fluid port C through the second opening/closing path P2 (see FIG. 3), the check valve 170 may let the hydraulic fluid simultaneously flow in one direction from the second fluid port B to the third fluid port C.

The valve block 180 includes valve chamber D, first fluid port A, second fluid port B, and third fluid port C. The first fluid port A, second fluid port B, and third fluid port C are in fluid communication with the valve chamber D.

Figure 12:
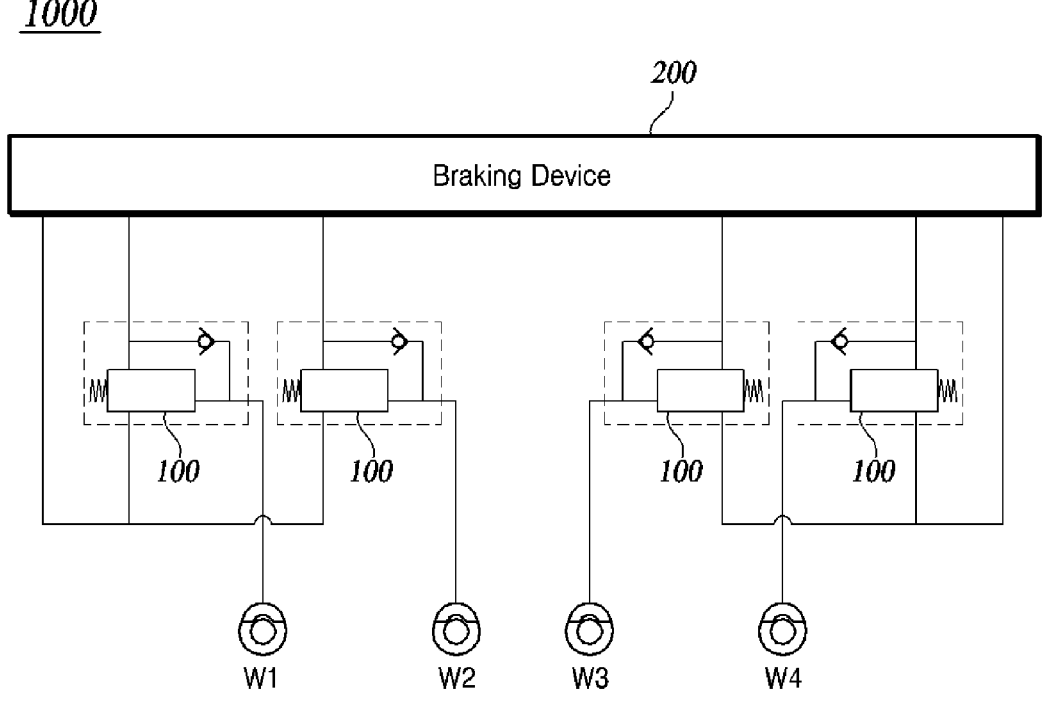
FIG. 12 is a block diagram of a brake system for a vehicle, including a 3-way solenoid valve according to at least one embodiment of the present disclosure.

Here, the first fluid port A may be an inlet or an outlet at a side toward a brake device 300 according to at least one embodiment of the present disclosure as shown in FIG. 12, in particular, a fluid inlet connected to an accumulator or a reservoir (both not shown) of the brake device 300. In general, when depressurizing one of the wheel cylinders W1, W2, W3, and W4 as shown in FIG. 12, the hydraulic fluid may flow from the second fluid port B toward the first fluid port A.

The second fluid port B may be a fluid inlet or outlet connected to one of the wheel cylinders W1, W2, W3, W4 (see FIG. 6) installed on the vehicle wheels, respectively.

The third fluid port C may be a fluid inlet or outlet connected to the braking device 300, in particular, its pressurizing device (not shown) according to at least one embodiment of the present disclosure. In general, when pressurizing the wheel cylinder W1, W2, W3, or W4, the hydraulic fluid may flow from the third fluid port C toward the second fluid port B.

As shown in FIG. 2, the first fluid port A and the second fluid port B may be formed on the side of the 3-way solenoid valve 100. The third fluid port C may be disposed on the bottom of the 3-way solenoid valve 100.

However, the first to third fluid ports A, B, C are not limited to the configuration and connection described above. Hydraulic fluid flowing in or out of the first to third fluid ports A, B, C flows through the valve chamber D in the valve block 180.

In FIG. 2, a first area X1 refers to the cross-sectional area in the X-direction, of the upper end of the flow path control assembly 150, enclosed by the sealing member 140. A second area X2 refers to the cross-sectional area in the X-direction, of the first opening/closing path P1 as sealed by the first flow control part 151. A third area X3 refers to the cross-sectional area in the X direction, of the second opening/closing path P2 as sealed by the second flow control part 155.

Figure 3:
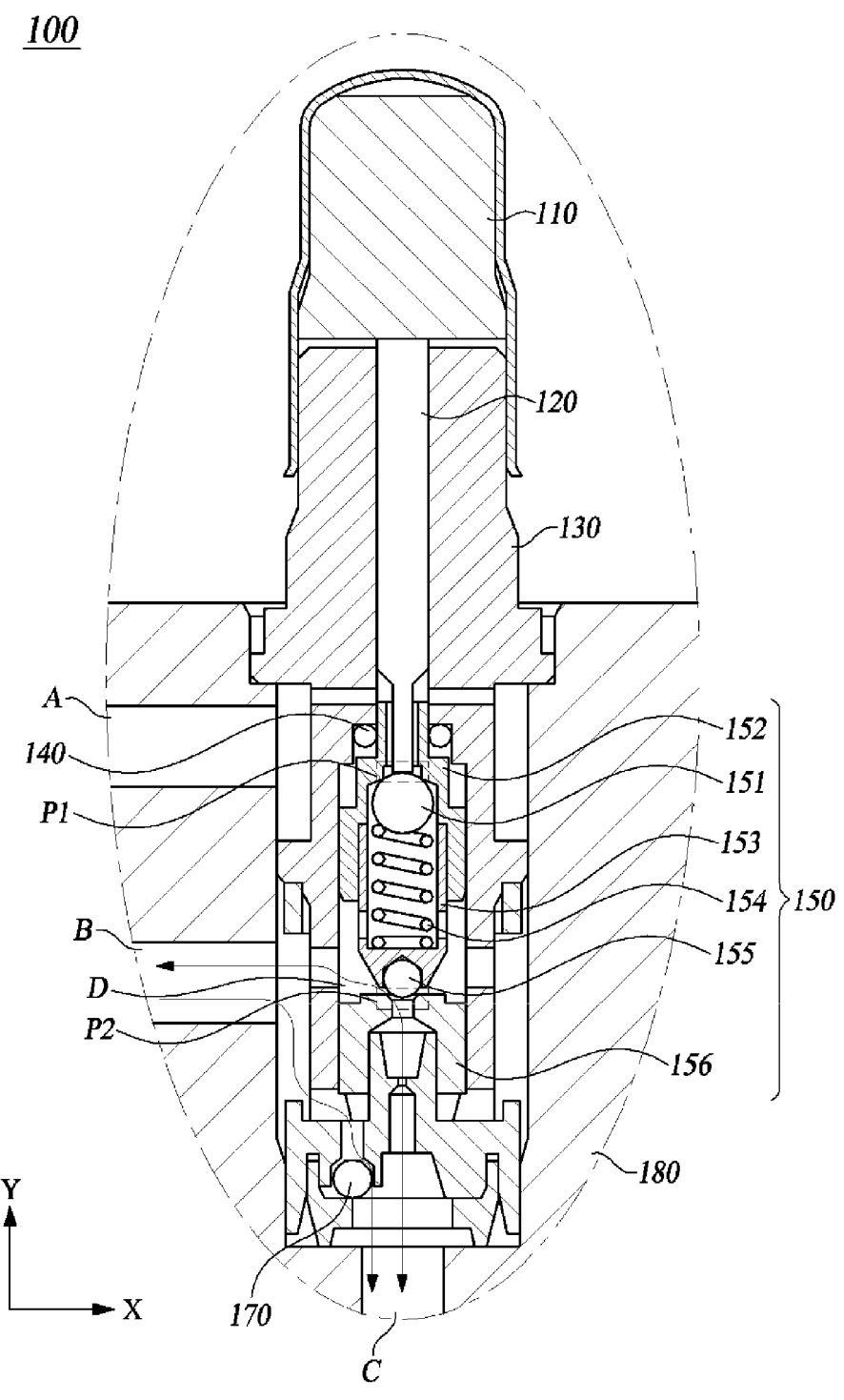
FIG. 3 is a cross-sectional view of the 3-way solenoid valve according to the first embodiment illustrating an armature producing no electromagnetic force, to explain the resultant flow of hydraulic fluid.
Figure 4:
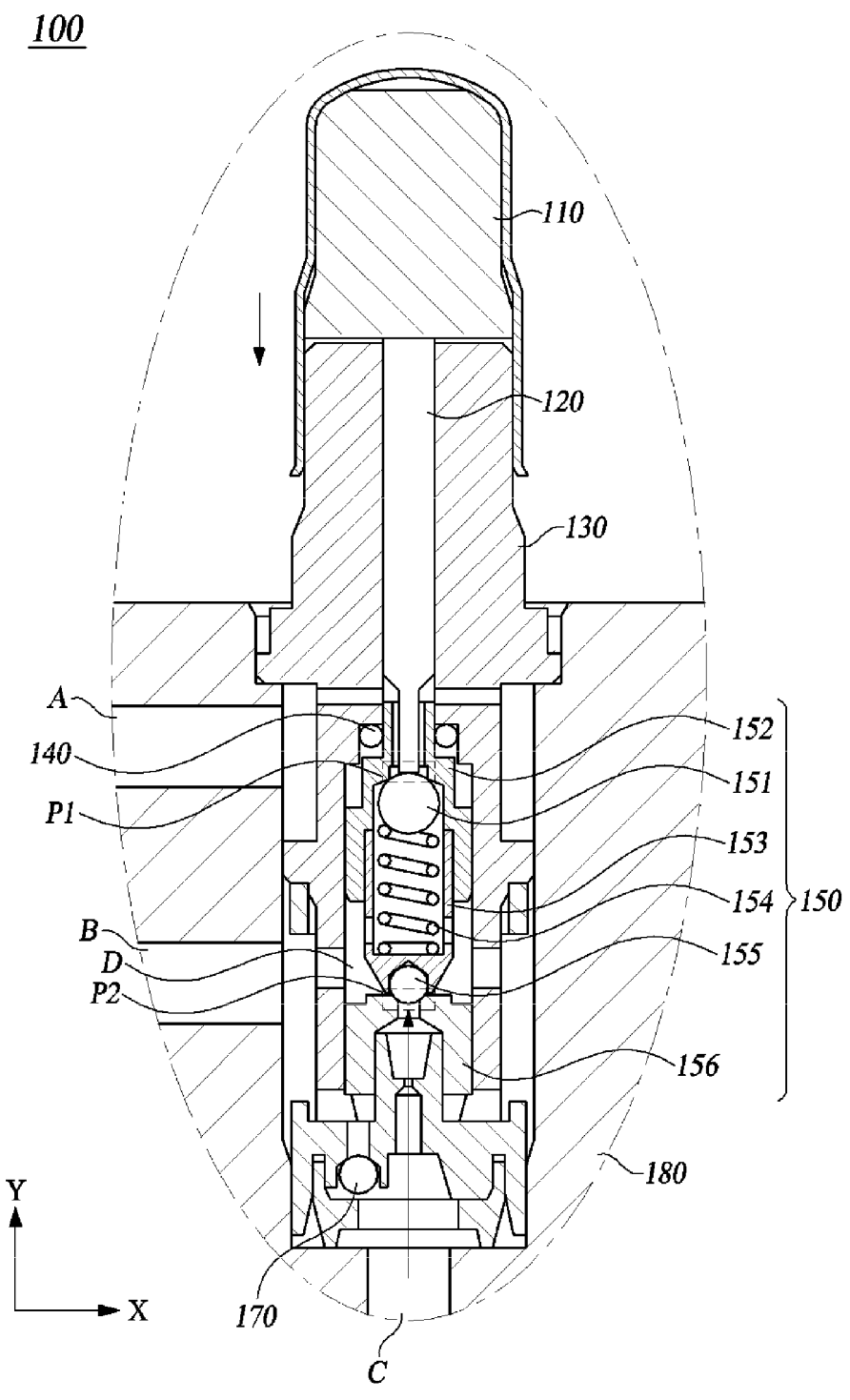
FIG. 4 is a cross-sectional view of the 3-way solenoid valve according to the first embodiment illustrating the armature producing forming a second electromagnetic force, to explain the resultant flow of hydraulic fluid.
Figure 5:
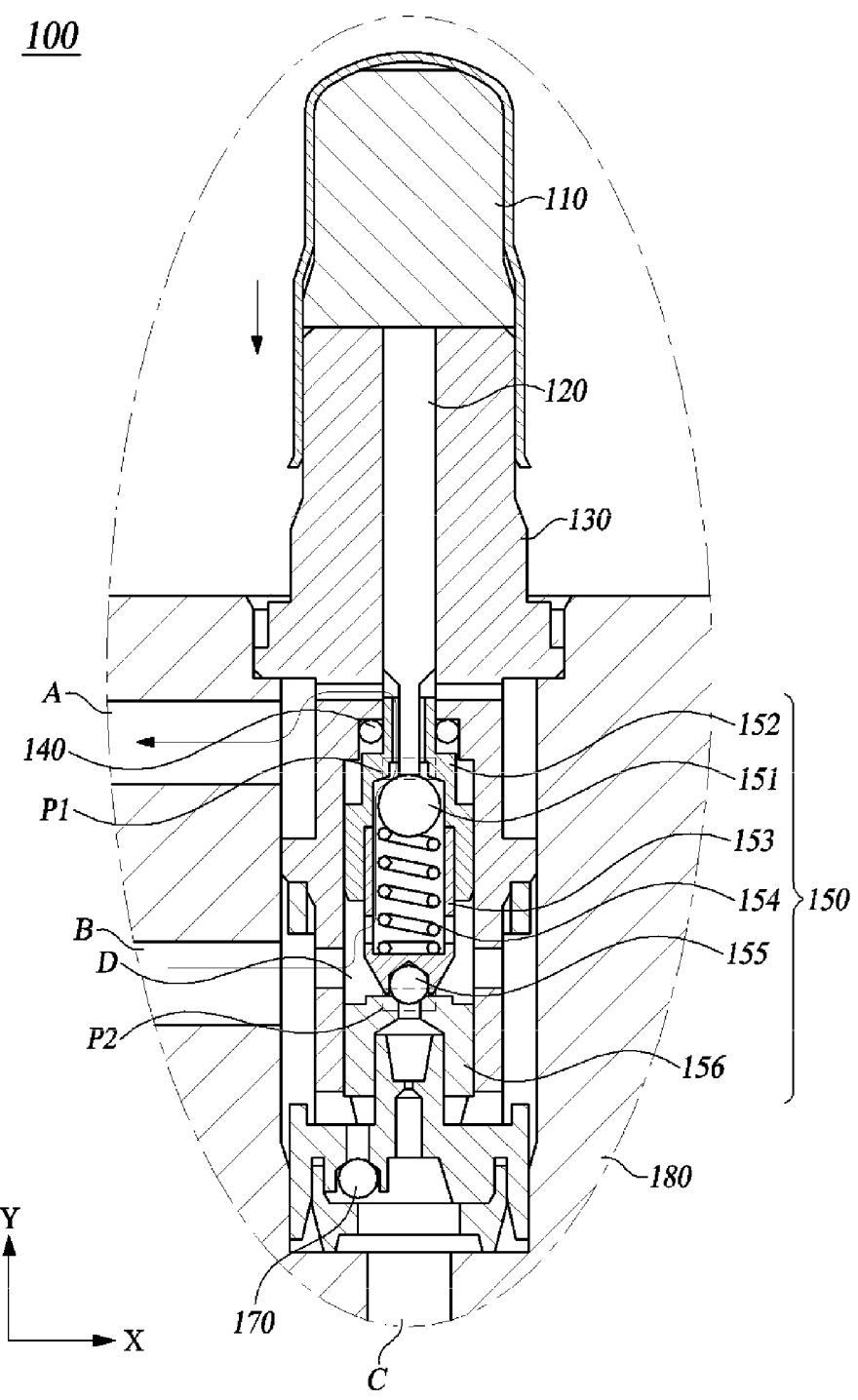
FIG. 5 is a cross-sectional view of the 3-way solenoid valve according to the first embodiment illustrating the armature producing a third electromagnetic force, to explain the resultant flow of hydraulic fluid.
Figure 6:
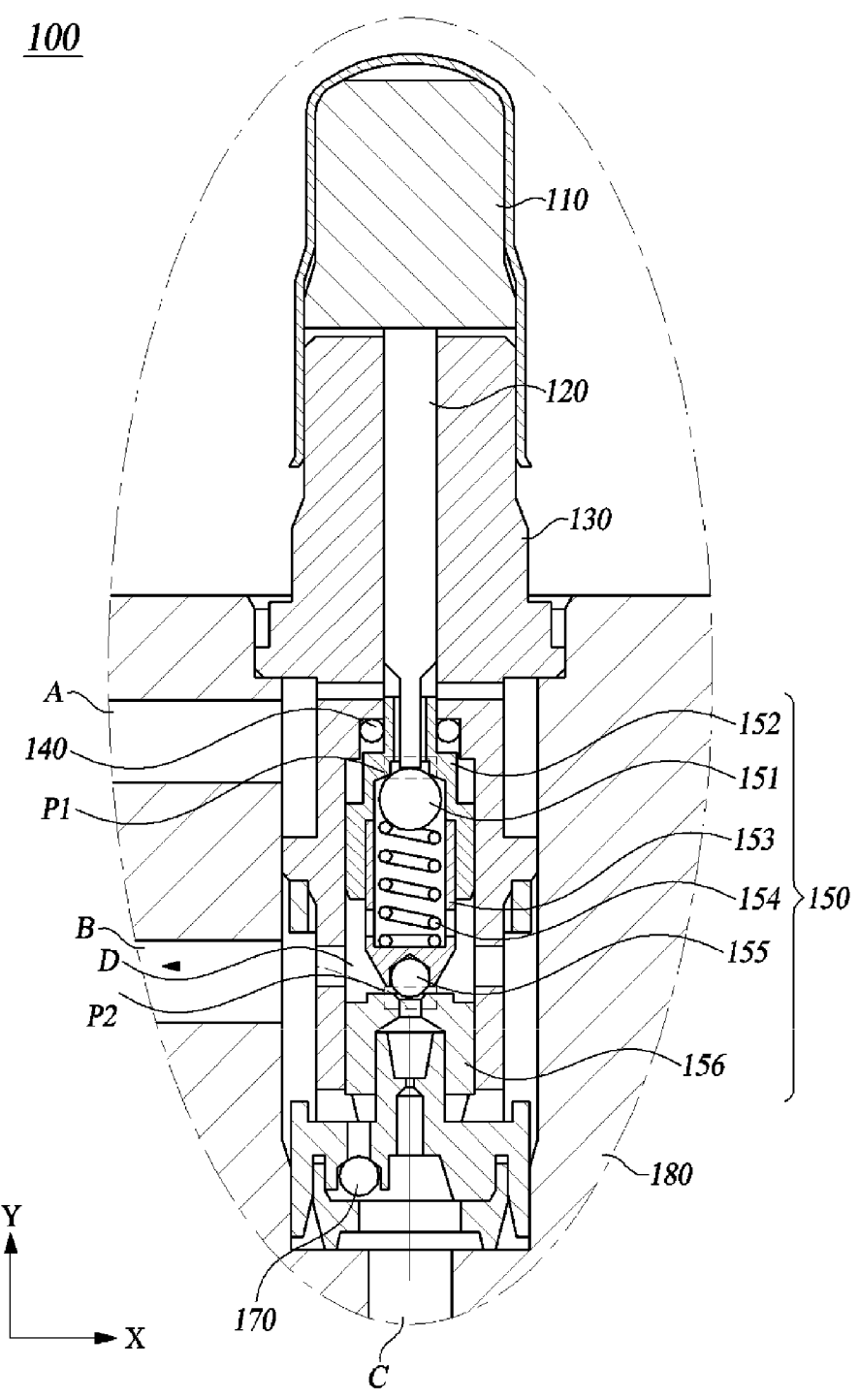
FIG. 6 is a cross-sectional view of the 3-way solenoid valve according to the first embodiment illustrating the armature producing a first electromagnetic force, to explain the resultant flow of hydraulic fluid.

FIG. 3 is a cross-sectional view of the 3-way solenoid valve according to the first embodiment illustrating an armature producing no electromagnetic force, to explain the resultant flow of hydraulic fluid. FIG. 4 is a cross-sectional view of the 3-way solenoid valve according to the first embodiment illustrating the armature producing a second electromagnetic force, to explain the resultant flow of hydraulic fluid. FIG. 5 is a cross-sectional view of the 3-way solenoid valve according to the first embodiment illustrating the armature producing a third electromagnetic force, to explain the resultant flow of hydraulic fluid. FIG. 6 is a cross-sectional view of the 3-way solenoid valve according to the first embodiment illustrating the armature producing a first electromagnetic force, to explain the resultant flow of hydraulic fluid.

With increasingly produced electromagnetic force, the armature 110 depresses the plunger 120 more strongly. In response to the magnitude of the electromagnetic force formed in the armature 110, the opening and closing of the first opening/closing path P1 and the second opening/closing path P2 may be regulated.

Here, the first to third electromagnetic forces are preset values, which may be obtained empirically and stored in the form of a look-up table (LUT) in the memory of the control unit. The first to third electromagnetic forces may each be stored as a predetermined range of values rather than a fixed value. The second electromagnetic force is greater than the first electromagnetic force, and the third electromagnetic force is greater than the second electromagnetic force.

The following description of FIGS. 3 to 6 defines the first to third fluid ports A, B, C of which the first fluid port A is defined as a port directly or indirectly connected to an accumulator (not shown) or a reservoir (not shown) of the brake system, the second fluid port B as a port connected directly or indirectly to the cylinder W1, W2, W3, or W4, and the third fluid port C as a port directly or indirectly connected to a pressurizing device (not shown) in the brake device 300. Here, the pressurizing device may be a master cylinder.

As shown in FIG. 3, with no electromagnetic force formed therein, the armature 110 does not depress the plunger 120. The second opening/closing path P2 may be opened or closed due to the pressure difference between the first fluid port A and the second, third fluid ports B, C, which will be described in detail below.

With no electromagnetic force formed in the armature 110, no drive is present to move the armature 110 toward the body 130. Therefore, the flow path control assembly 150 does not receive an external force from the plunger 120. In this case, due to the elastic force of the first elastic part 154, the first flow control part 151 is depressed upward to close the first opening/closing path P1. The second opening/closing path P2 is open because the pressure generated in the second fluid port B and the third fluid port C depresses the first area X1 in the positive Y-direction.

Specifically, when pressure is applied to the third fluid port C from the pressurizing device (not shown), the second opening/closing path P2 is opened to allow the hydraulic fluid to pass through the second fluid port B and the wheel cylinder W1, W2, W3, or W4. Upon releasing the pressure of the pressurizing device, the second opening/closing path P2 is opened again for allowing the hydraulic fluid to flow from the second fluid port B to the third fluid port C and thereby depressurizing the wheel cylinder W1, W2, W3, or W4. When the hydraulic fluid flows from the second fluid port B toward the third fluid port C, the fluid may also flow through the check valve 170.

In general, in a vehicle braking system, the inlet valve is of a normally open type in which the flow path is open when no current is applied, and the outlet valve is of a normally closed type in which the flow path is closed when no current is applied.

According to the first embodiment of the present disclosure, the 3-way solenoid valve 100 with no current applied renders the second opening/closing path P2 to open between the second fluid port B and the third fluid port C and renders the first opening/closing path P1 to close between the first fluid port A and the second fluid port B. Accordingly, the 3-way solenoid valve 100 according to the first embodiment has the full features of both the conventional normally open type inlet valve and the conventional normally closed type outlet valve.

Additionally, the check valve 170 is formed so that the fluid flows one way from the second fluid port B to the third fluid port C, which serves to replace the check valve conventionally arranged in an inlet valve.

As shown in FIG. 4, with the second electromagnetic force formed therein, the armature 110 depresses the plunger 120. Here, the second electromagnetic force may be set to be greater than the total force generated by the pressure applied by the third fluid port C to the third area X3 plus the pressure exerted by the second fluid port B on the areal difference between the first area X1 and the third area X3. However, the second electromagnetic force needs to be set to be less than the sum of the pressure applied by the second fluid port B to the second area X2 and the expansion force of the first elastic part 154.

The armature 110 in which the second electromagnetic force is formed may indirectly depress the second flow control part 155 to close the second opening/closing path P2. However, the armature 110 formed with the second electromagnetic force also closes the first opening/closing path P1 because it cannot indirectly depress and thus compress the first elastic part 154.

Here, the indirect depression by the armature 110 means that the armature 110 has its electromagnetic force move the plunger 120 in the negative Y-direction, which generates power transmitted to the flow path control assembly 150 to pressurize the flow path control assembly 150 at the components thereof. When energized by the second electromagnetic force, the armature 110 reduces its gap between the body 130 up to the point where they are not close enough to be in close contact with each other.

When the second electromagnetic force is formed in the armature 110, the second opening/closing path P2 is closed, and therefore the hydraulic pressure formed by the pressurizing device cannot be delivered from the third fluid port C to the second fluid port B let alone reaching the wheel cylinder W1, W2, W3, or W4 though the second fluid port B. Additionally, since the first opening/closing path P1 is also closed, the hydraulic pressure formed in the wheel cylinder W1, W2, W3, or W4 cannot be delivered from the second fluid port B through the first fluid port A to the accumulator or the reservoir (both not shown) of the brake device 300. In short, the armature 110 when formed with the second electromagnetic force maintains the hydraulic pressure as formed in the wheel cylinders W1, W2, W3, and W4.

The step of FIG. 4 corresponds to a case of the conventional vehicle braking system where both the inlet valve and the outlet valve are closed. The step of FIG. 4 may be applied to maintain the braking pressure supplied to the wheel cylinder W1, W2, W3, or W4.

As shown in FIG. 5, the armature 110 when formed with the third electromagnetic force depresses the plunger 120. In this case, the third electromagnetic force may be set to be greater than a total force obtained by adding a pressure applied by the second fluid port B to the second area X2 and an expansion force of the first elastic part 154.

The armature 110 having the third electromagnetic force formed therein, indirectly depresses the second flow control part 155 to close the second opening/closing path P2 and indirectly depresses and compresses the first elastic unit 154 to open the first opening/closing path P1.

The armature 110 having the third electromagnetic force formed therein, closes the second opening/closing path P2, and therefore the hydraulic pressure formed by the pressurizing device cannot be delivered from the third fluid port C to the second fluid port B let alone reaching the wheel cylinder W1, W2, W3, or W4 though the second fluid port B. However, since the first opening/closing path P1 is open, the hydraulic pressure formed in the wheel cylinder W1, W2, W3, or W4 is delivered from the second fluid port B through the first fluid port A to the accumulator or the reservoir. In short, the armature 110 when formed with the third electromagnetic force reduces the hydraulic pressure formed in the wheel cylinders W1, W2, W3, or W4.

The step of FIG. 5 corresponds to a case of the conventional vehicle braking system closing the inlet valve and opening the outlet valve. The step of FIG. 5 may be applied to reduce the braking pressure supplied to the wheel cylinders W1, W2, W3, or W4.

As shown in FIG. 6, the armature 110 having the first electromagnetic force formed therein, depresses the plunger 120. The first electromagnetic force may be set to be weaker than the second electromagnetic force. The armature 110 with the first electromagnetic force formed indirectly depresses the second flow control part 155 but does it with a force less than the pressure in the third fluid port C, and therefore it cannot completely close the second opening/closing path P2. This lets the hydraulic fluid flow from the third fluid port C to the second fluid port B. The first opening/closing path P1 is closed.

Since the armature 110 with the first electromagnetic force formed partially opens the second opening/closing path P2, the hydraulic pressure formed in the pressurizing device may be transferred from the third fluid port C through the second fluid port B to the wheel cylinder W1, W2, W3, or W4. With the first opening/closing path P1 closed, the hydraulic pressure formed in the wheel cylinder W1, W2, W3, or W4 cannot be delivered from the second fluid port B through the first fluid port A to the accumulator. In short, the armature 110 when having the first electromagnetic force formed therein adds its force to the hydraulic pressure formed in the wheel cylinders W1, W2, W3, and W4.

The step of FIG. 6 corresponds to a case of the conventional vehicle braking system opening the inlet valve and closing the outlet valve. The step of FIG. 6 may be applicable to boost the braking pressure supplied to the wheel cylinders W1, W2, W3, or W4.

Boosting the pressure in the wheel cylinder W1, W2, W3, or W4 by using the step of FIG. 6 may sharply increase the pressure in the wheel cylinder W1, W2, W3, or W4 to incur a sliding phenomenon or wheel-lock in the running vehicle. As a fix to this issue, the present disclosure in some embodiments gradually increases the hydraulic pressure to the wheel cylinder W1, W2, W3, or W4 by first producing the first electromagnetic force corresponding to a force short of opening the first opening/closing path P1 and then linearly reducing the first electromagnetic force to partially close the second opening/closing path P2.

Figure 7:
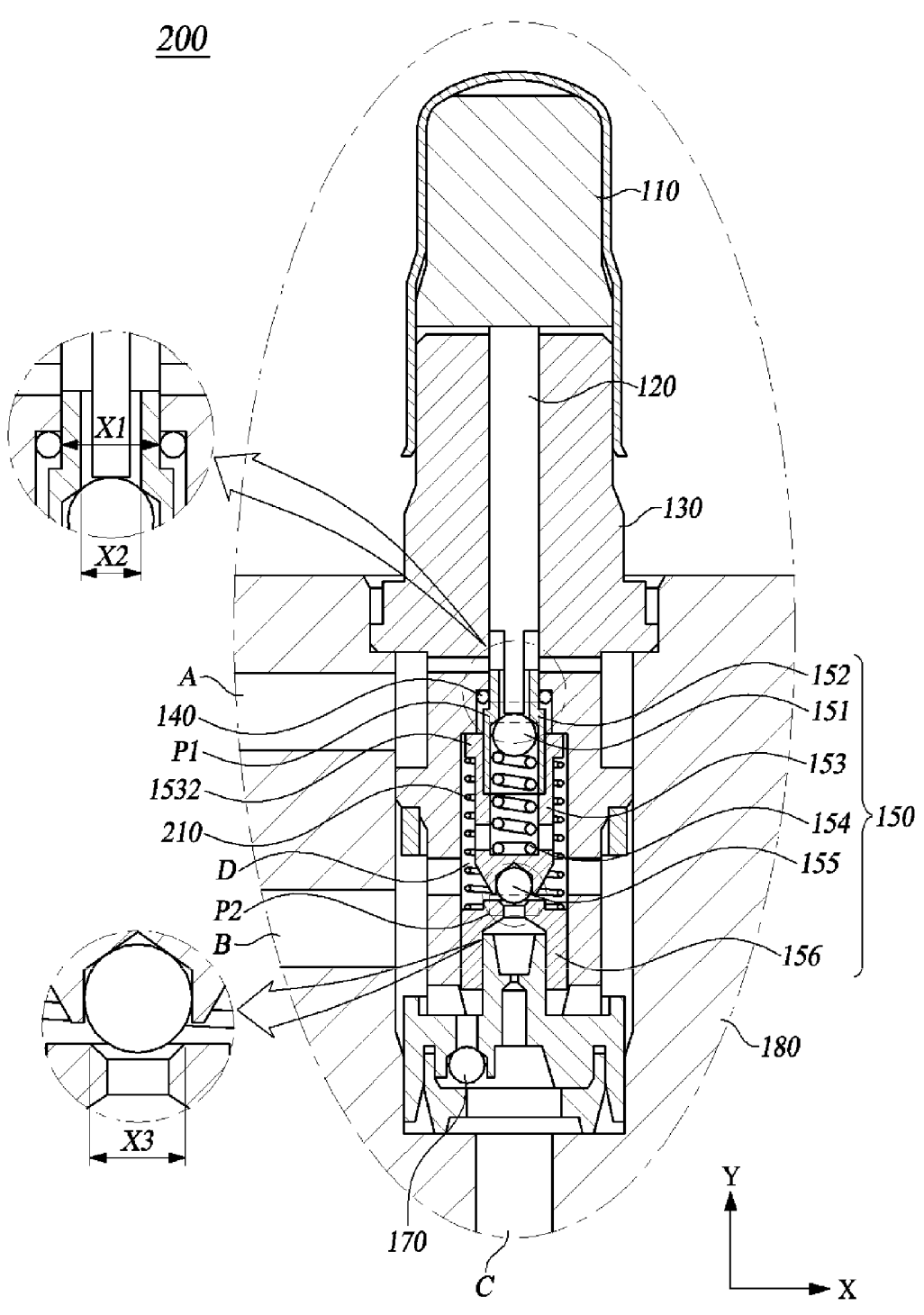
FIG. 7 is a cross-sectional view of a 3-way solenoid valve according to a second embodiment of the present disclosure.

FIG. 7 is a cross-sectional view of a 3-way solenoid valve 200 according to a second embodiment of the present disclosure.

As shown in FIG. 7, the 3-way solenoid valve 200 according to the second embodiment includes all or some of an armature 110, a plunger 120, a body 130, a sealing member 140, a flow path control assembly 150, a first elastic part 154, a second elastic part 210, a check valve 170, and a valve block 180.

The 3-way solenoid valve 200 of FIG. 7 according to the second embodiment has a housing 152, 153 that is made of a housing top 152 and a housing bottom 153 which are different from the counterparts of the solenoid valve 100 of FIG. 2 according to the first embodiment. Other than that, the two 3-way solenoid valves 200 and 300 have substantially the same configuration. Therefore, a repeat description of the common parts will be omitted.

In the 3-way solenoid valve 200 according to the second embodiment, the housing bottom 153 has at its upper end a protrusion that protrudes along a plane including some portion in the X-direction and generally extending perpendicular to the Y-direction. Thanks to the shape of the housing bottom 153, the present disclosure features improved durability of the plunger 120 when no electromagnetic force is formed in the armature 110. A detailed description of the technical feature will be provided referring to FIG. 8.

The second elastic part 210 is disposed in the valve chamber D, has one end that is in contact with the upper surface of the valve seat 156, and may be configured to supply the expansion force in the positive Y-direction to the housing 152, 153. The second elastic part 210 may be arranged to surround a part of the flow path control assembly 150. The second elastic part 210 may be a spring. The elastic modulus of the second elastic part 210 may be lower than that of the first elastic part 154.

The direction of the elastic force provided by the first elastic part 154 and the direction of the elastic force provided by the second elastic part 210 may be parallel to each other. The first elastic part 154 is disposed within the flow path control assembly 150, and the second elastic part 210 surrounds the outer circumferential surface of the flow path control assembly 150, thereby ensuring space efficiency.

The second elastic part 210 is not necessarily arranged only in the 3-way solenoid valve 200 according to the second embodiment, but also be arranged in the 3-way solenoid valve 100 according to the first embodiment. In particular, in the 3-way solenoid valve 100 according to the first embodiment, the second elastic part 220 may be arranged to have one end contacting the housing 152, 153 and the other end contacting the valve seat 156.

Figure 8:
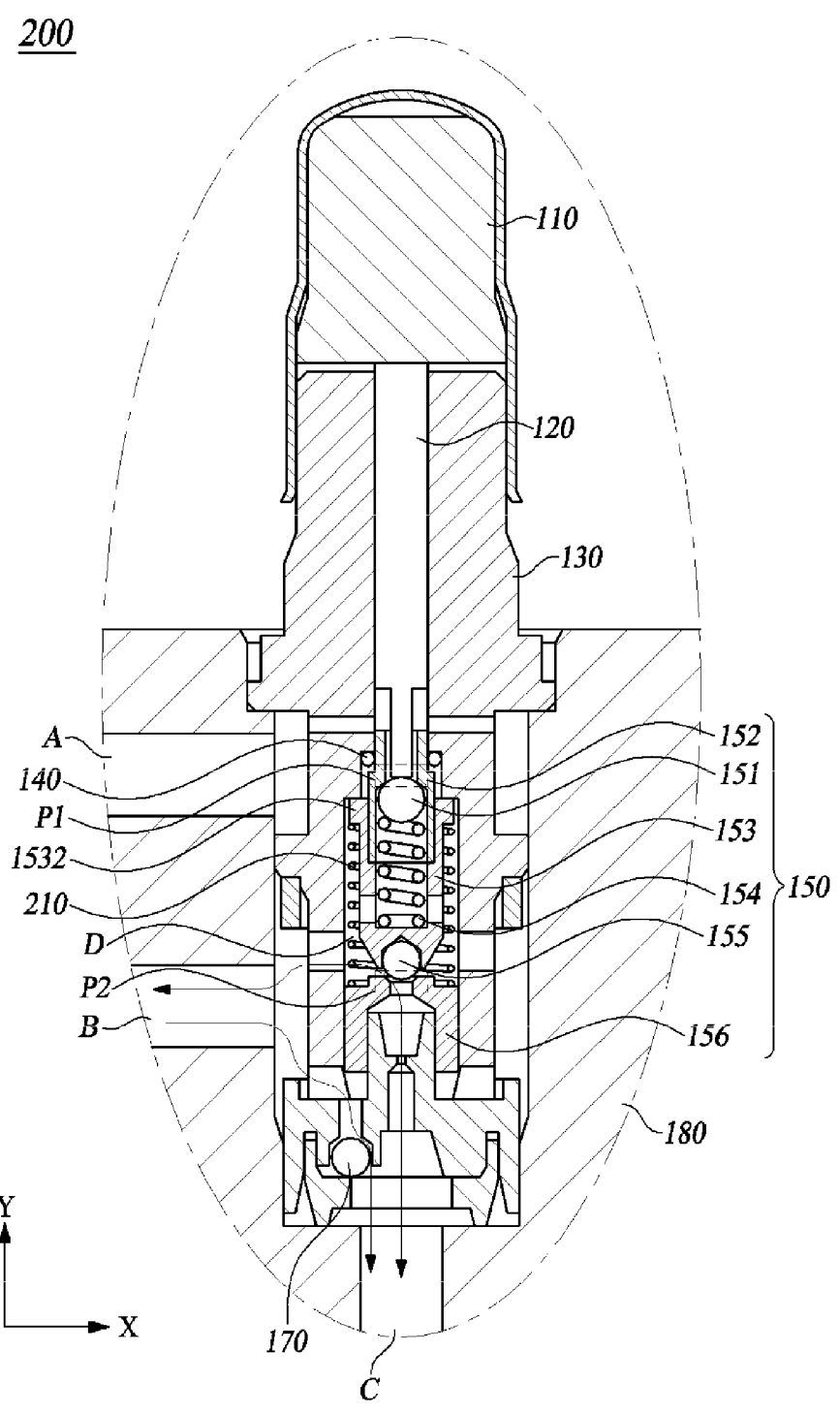
FIG. 8 is a cross-sectional view of the 3-way solenoid valve according to the second embodiment illustrating an armature producing no electromagnetic force, to explain the resultant flow of hydraulic fluid.
Figure 9:
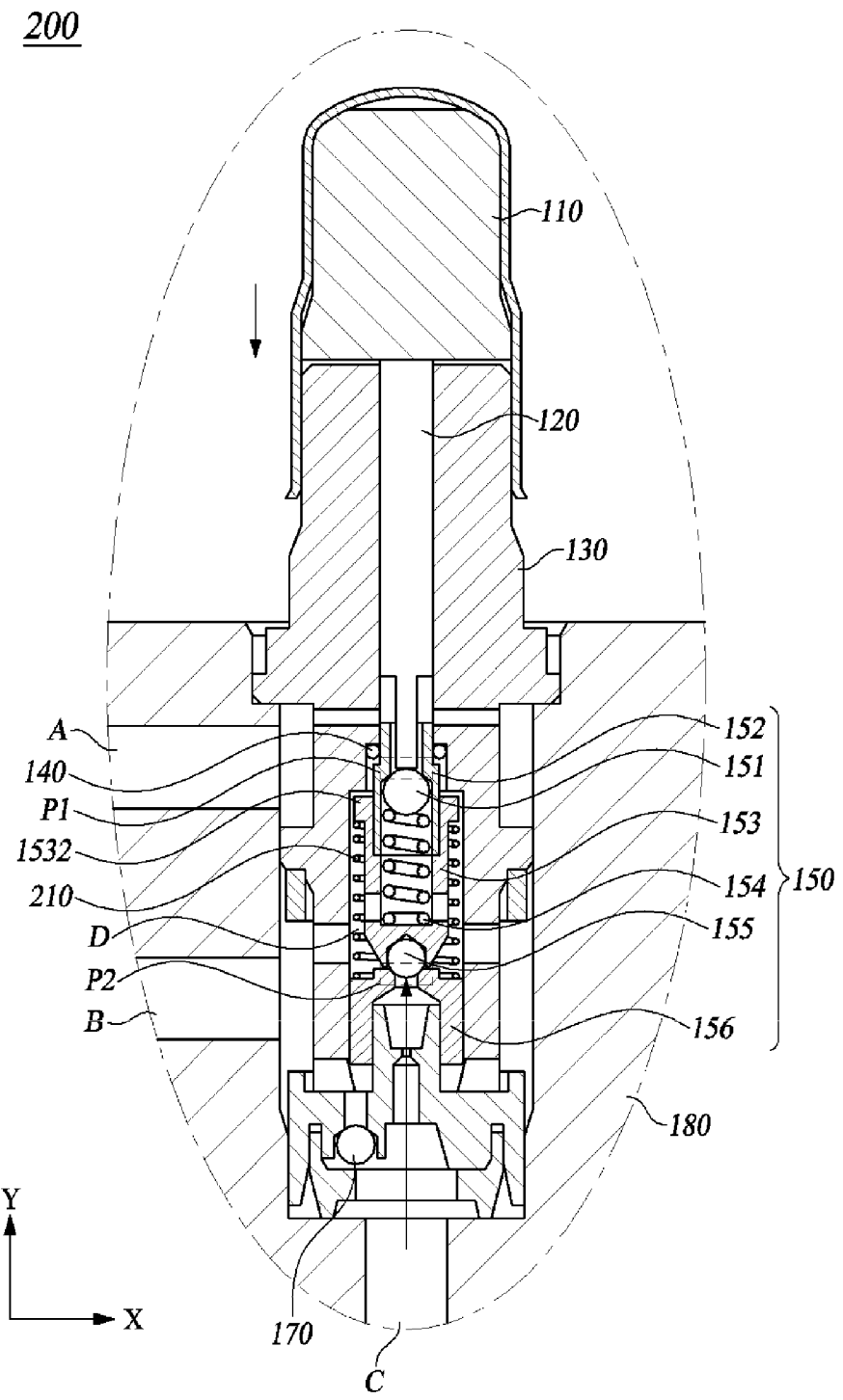
FIG. 9 is a cross-sectional view of the 3-way solenoid valve according to the second embodiment illustrating the armature producing a second electromagnetic force, to explain the resultant flow of hydraulic fluid.
Figure 10:
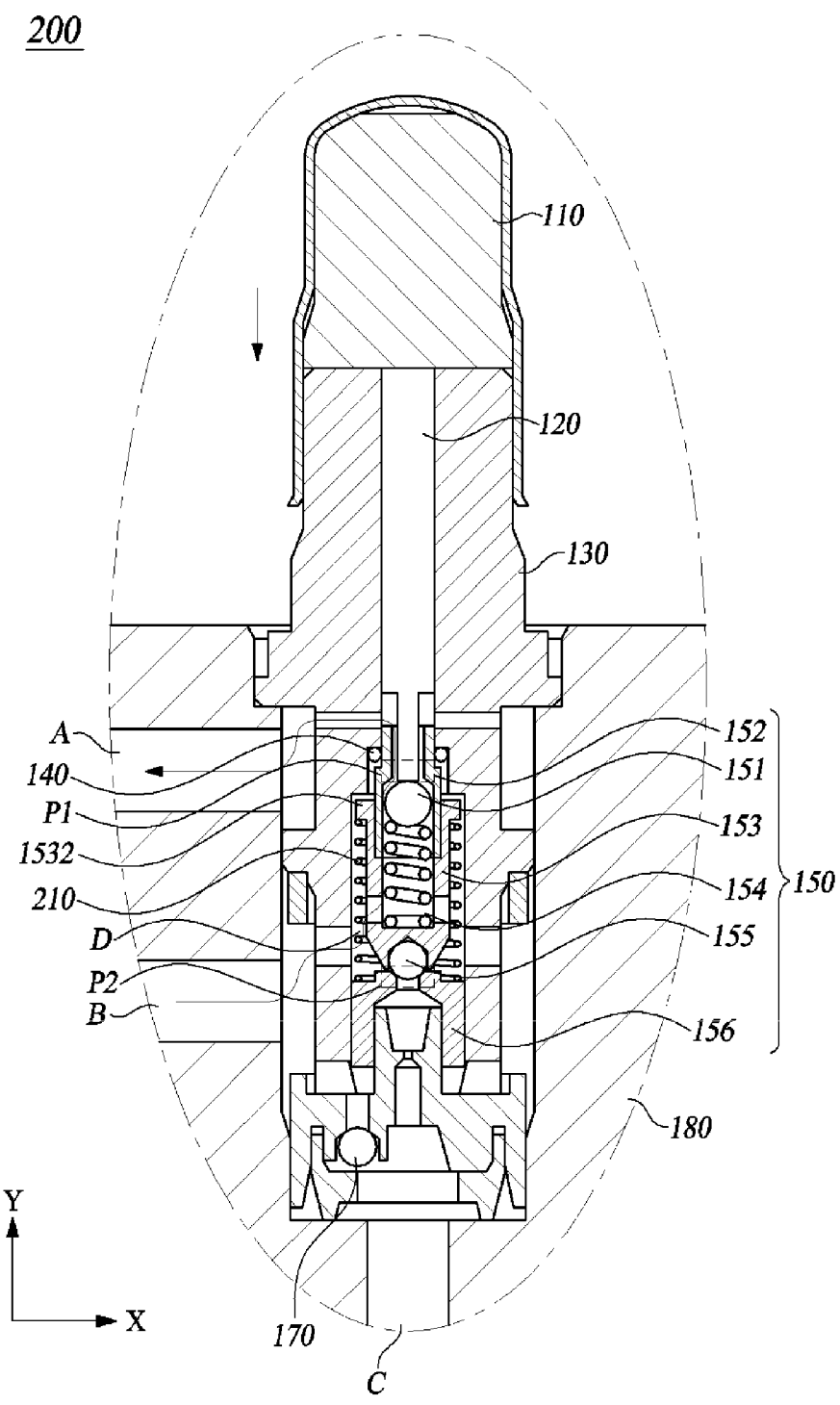
FIG. 10 is a cross-sectional view of the 3-way solenoid valve according to the second embodiment illustrating the armature producing a third electromagnetic force, to explain the resultant flow of hydraulic fluid.
Figure 11:
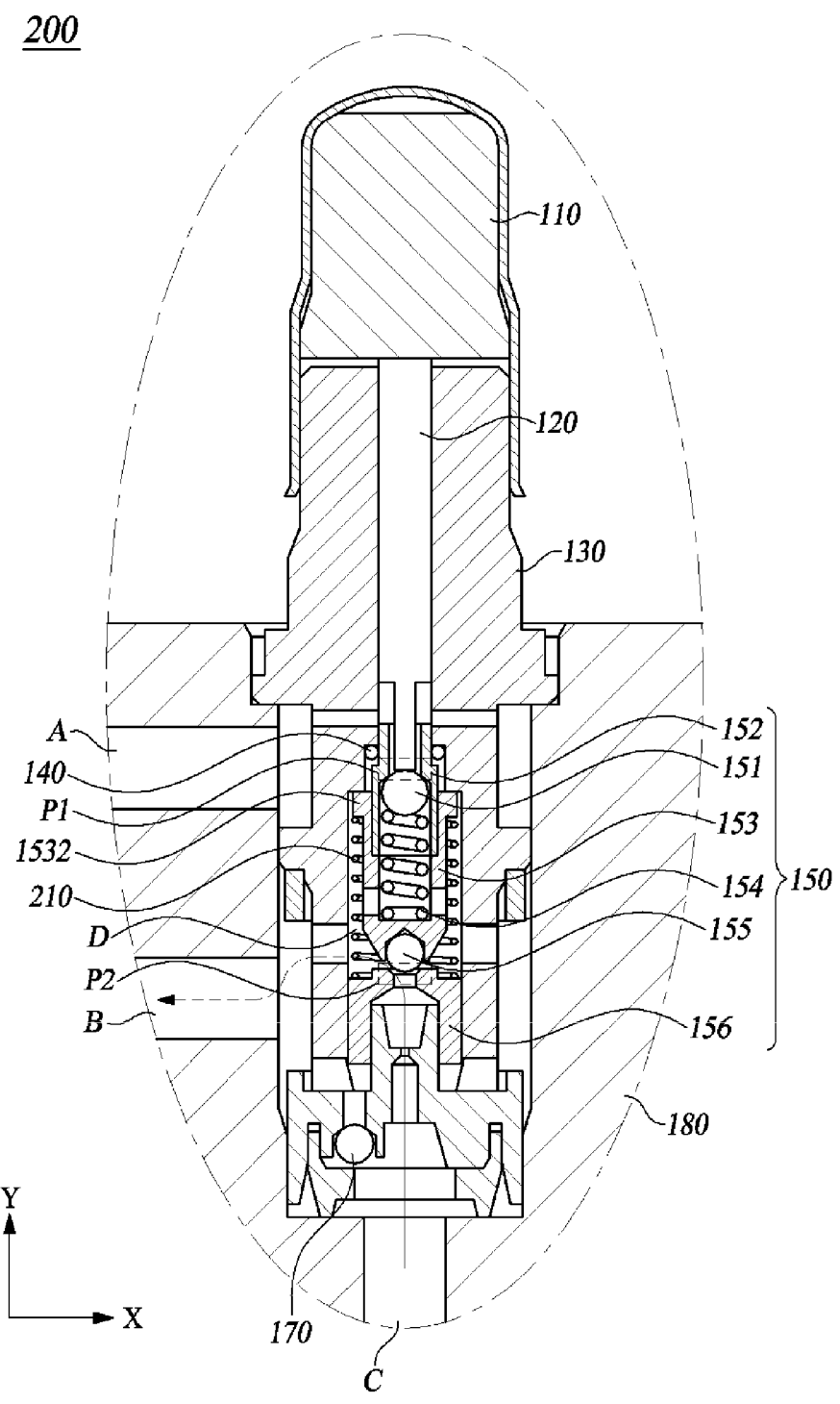
FIG. 11 is a cross-sectional view of the 3-way solenoid valve according to the second embodiment illustrating the armature producing a first electromagnetic force, to explain the resultant flow of hydraulic fluid.

FIG. 8 is a cross-sectional view of the 3-way solenoid valve according to the second embodiment illustrating an armature producing no electromagnetic force, to explain the resultant flow of hydraulic fluid. FIG. 9 is a cross-sectional view of the 3-way solenoid valve according to the second embodiment illustrating the armature producing a second electromagnetic force, to explain the resultant flow of hydraulic fluid. FIG. 10 is a cross-sectional view of the 3-way solenoid valve according to the second embodiment illustrating the armature producing a third electromagnetic force, to explain the resultant flow of hydraulic fluid. FIG. 11 is a cross-sectional view of the 3-way solenoid valve according to the second embodiment illustrating the armature producing a first electromagnetic force, to explain the resultant flow of hydraulic fluid.

As defined by the following description of FIGS. 8 to 11, the first fluid port A is a port directly or indirectly connected to an accumulator (not shown) of the brake system, the second fluid port B is a port directly or indirectly connected to the cylinder W1, W2, W3, or W4, and the third fluid port C is a port directly or indirectly connected to a pressurizing device (not shown) in the brake device 300. Here, the pressurizing device may be a master cylinder.

As shown FIG. 8, the armature 110 having no electromagnetic force formed therein, does not depress the plunger 120. The second opening/closing path P2 may be opened due to hydraulic pressure in the second fluid port B and the third fluid port C.

As the second opening/closing path P2 is opened, the housing bottom 153 moves in the positive Y-direction. The first embodiment moves the housing bottom 153 in the positive Y-direction to depress the plunger 120 in the same direction. Whereas, the second embodiment provides the housing bottom 153 with the upper protrusion 1532 adapted to be caught on a part of the body 130, which can immobilize the flow path control assembly 150. As a result, the second embodiment features improved durability of the plunger 120 because the plunger 120 is free of depression when the armature 110 has no electromagnetic force formed therein.

The 3-way solenoid valve 200 according to the second embodiment is configured so that the second opening/closing path P2 is open between the second fluid port B and the third fluid port C when no current is applied, while the first opening/closing path P1 is closed between the first fluid port A and the second fluid port B. Accordingly, the 3-way solenoid valve 200 according to the second embodiment has all the features of a conventional normally open type inlet valve and a conventional normally closed type outlet valve.

As shown in FIG. 9, the armature 110 having the second electromagnetic force formed therein, depresses the plunger 120. Here, the second electromagnetic force may be set to be greater than the total force generated by the pressure applied by the third fluid port C to the third area X3 plus the pressure exerted by the second fluid port B on the areal difference between the first area X1 and the third area X3. However, the second electromagnetic force needs to be set to be less than the sum of the pressure applied by the second fluid port B to the second area X2 and the expansion force of the first elastic part 154.

In other words, the armature 110 in which the second electromagnetic force is formed may indirectly depress the second flow control part 155 to close the second opening/closing path P2. Additionally, since the armature 110 on which the second electromagnetic force is formed cannot indirectly depress the first elastic part 154 to compress it, the first opening/closing path P1 is also closed.

When the second electromagnetic force is formed in the armature 110, the second opening/closing path P2 is closed, and therefore the hydraulic pressure formed by the pressurizing device cannot be delivered from the third fluid port C to the second fluid port B let alone reaching the wheel cylinder W1, W2, W3, or W4 though the second fluid port B.

Additionally, since the first opening/closing path P1 is also closed, the hydraulic pressure formed in the wheel cylinder W1, W2, W3, or W4 cannot be delivered from the second fluid port B through the first fluid port A to the accumulator of the brake device 300. In short, the armature 110 when formed with the second electromagnetic force maintains the hydraulic pressure as formed in the wheel cylinders W1, W2, W3, and W4.

The step of FIG. 9 corresponds to a case of the conventional vehicle braking system where both the inlet valve and the outlet valve are closed. The step of FIG. 9 may be applied to maintain the braking pressure supplied to the wheel cylinder W1, W2, W3, or W4. The steps of FIGS. 9 to 11 take the course similar to those of the first embodiment.

As shown in FIG. 10, the armature 110 when formed with the third electromagnetic force depresses the plunger 120. In this case, the third electromagnetic force may be set to be greater than or equal to a total force obtained by adding a pressure applied by the second fluid port B to the second area X2 and an expansion force of the first elastic part 154.

The armature 110 having the third electromagnetic force formed therein, indirectly depresses the second flow control part 155 to close the second opening/closing path P2 and indirectly depresses and compresses the first elastic unit 154 to open the first opening/closing path P1.

The armature 110 having the third electromagnetic force formed therein, closes the second opening/closing path P2, and therefore the hydraulic pressure formed by the pressurizing device cannot be delivered from the third fluid port C to the second fluid port B let alone reaching the wheel cylinder W1, W2, W3, or W4 though the second fluid port B. However, since the first opening/closing path P1 is open, the hydraulic pressure formed in the wheel cylinder W1, W2, W3, or W4 is delivered from the second fluid port B through the first fluid port A to the accumulator. In short, the armature 110 when formed with the third electromagnetic force reduces the hydraulic pressure formed in the wheel cylinders W1, W2, W3, or W4.

The step of FIG. 10 corresponds to a case of the conventional vehicle braking system closing the inlet valve and opening the outlet valve. The step of FIG. 10 may be applied to reduce the braking pressure supplied to the wheel cylinders W1, W2, W3, or W4.

As shown in FIG. 11, the armature 110 having the first electromagnetic force formed therein, depresses the plunger 120. The first electromagnetic force may be set to be weaker than the second electromagnetic force.

The armature 110 with the first electromagnetic force formed indirectly depresses the second flow control part 155 but does the same with a force less than the pressure in the third fluid port C, and therefore it cannot completely close the second opening/closing path P2. This lets the hydraulic fluid flow from the third fluid port C to the second fluid port B. The first opening/closing path P1 is closed.

The armature 110 having the first electromagnetic force formed therein, partially opens the second opening/closing path P2, which may cause the hydraulic pressure formed in the pressurizing device to be transferred from the third fluid port C through the second fluid port B to the wheel cylinder W1, W2, W3, or W4.

With the first opening/closing path P1 closed, the hydraulic pressure formed in the wheel cylinder W1, W2, W3, or W4 cannot be delivered from the second fluid port B through the first fluid port A to the accumulator. In short, the armature 110 formed with the first electromagnetic force boosts the hydraulic pressure formed in the wheel cylinders W1, W2, W3, and W4.

The step of FIG. 11 corresponds to a case of the conventional vehicle braking system opening the inlet valve and closing the outlet valve. The step of FIG. 11 may be applicable to boost the braking pressure supplied to the wheel cylinders W1, W2, W3, or W4.

Boosting the pressure in the wheel cylinder W1, W2, W3, or W4 by using the step of FIG. 11 may cause a surge of pressure in the wheel cylinder W1, W2, W3, or W4 to incur a sliding phenomenon or wheel-lock in the running vehicle. As a fix to this issue, the present disclosure in some embodiments gradually increases the hydraulic pressure to the wheel cylinder W1, W2, W3, or W4 by first producing the first electromagnetic force corresponding to a force just short of opening the first opening/closing path P1 and then linearly reducing the first electromagnetic force.

FIG. 12 is a block diagram of a braking system 1000 for a vehicle, including a 3-way solenoid valve according to at least one embodiment of the present disclosure.

As shown in FIG. 12, the vehicle braking system 1000 according to at least one embodiment of the present disclosure includes the braking device 300, one or more 3-way solenoid valves 100 or 200, and one or more wheel cylinders W1, W2, W3, or W4. Here, the 3-way solenoid valve 100 or 200 is as described in FIGS. 2 to 11.

The wheel cylinder W1, W2, W3, or W4 is disposed on each wheel of the vehicle to apply braking pressure by using hydraulic pressure to each wheel. When hydraulic pressure is supplied to the wheel cylinder W1, W2, W3, or W4, the brake pad disposed on the vehicle wheel contacts the wheel disk provided to generate a friction force, thereby producing a braking force.

The braking device 300 is arranged to supply hydraulic pressure to the wheel cylinder W1, W2, W3, or W4 by using foot pressure applied to the brake pedal or driving of a hydraulic pump. Here, the braking device 300 may amplify the foot pressure generated when the driver depresses the brake pedal and supply hydraulic pressure with that generated force, or it may receive the driver's pedal stroke electronically and operate the hydraulic pump as much as the pedal stroke to supply hydraulic pressure.

The block diagram of the vehicle braking system shown in FIG. 12 is illustrative and is not limited to the configuration and arrangement shown in FIG. 12, and other configurations of the vehicle braking system, as long as they employ the 3-way solenoid valve of the present disclosure, are encompassed by the present disclosure.

Figure 13:
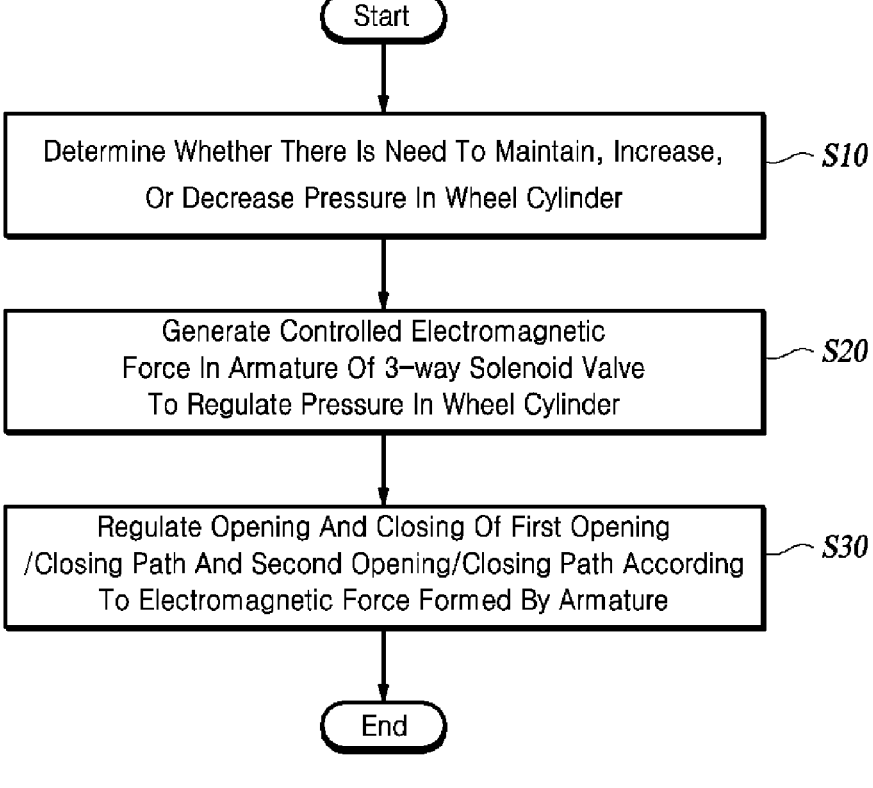
FIG. 13 is a flowchart of a method of controlling a 3-way solenoid valve according to at least one embodiment of the present disclosure.

FIG. 13 is a flowchart of a method of controlling a 3-way solenoid valve according to at least one embodiment of the present disclosure. In the description of the flowchart, a repeat description of the above-described contents will be omitted.

A control unit (not shown) determines whether the pressure in a wheel cylinder needs to be maintained, increased, or decreased (S10).

The control unit generates a controlled electromagnetic force in the armature of the 3-way solenoid valve 100 or 200 to regulate the pressure in the wheel cylinder W1, W2, W3, or W4 (S20). The armature 110 is configured to form a first electromagnetic force, a second electromagnetic force greater than the first electromagnetic force, and a third electromagnetic force greater than the second electromagnetic force. The first to third electromagnetic force values may be set to appropriate values empirically, and they may be determined as described referring to FIGS. 2 to 11.

The opening and closing of the first opening/closing path P1 and the second opening/closing path P2 may be regulated according to the electromagnetic force formed in the armature 110.

Upon determining in Step S10 that the pressure needs an increase in the wheel cylinder W1, W2, W3, or W4, the control unit performs control over the armature 110 to form the first electromagnetic force. In this case, the control unit may linearly decrease the first electromagnetic force to linearly increase the pressure in the wheel cylinder W1, W2, W3, or W4.

Upon determining in Step S20 that the pressure needs to stay the same in the wheel cylinder W1, W2, W3, or W4, the control unit performs control over the armature 110 to form the second electromagnetic force.

Upon determining in Step S30 that the pressure needs a decrease in the wheel cylinder W1, W2, W3, or W4, the control unit performs control over the armature 110 to form the third electromagnetic force.

The 3-way solenoid valve 100 or 200 regulates the opening and closing of the first opening/closing path P1 and the second opening/closing path P2 according to the electromagnetic force formed by the armature (S30). Here, the first opening/closing path P1 is a flow path for controlling the flow of hydraulic fluid between the accumulator or reservoir and the wheel cylinder W1, W2, W3, or W4. The second opening/closing path P2 is a flow path for controlling the flow of hydraulic fluid between the wheel cylinder W1, W2, W3, or W4 and the pressurizing device.

When the first electromagnetic force is formed in the armature 110, the first opening/closing path P1 may be closed and the second opening/closing path P2 may be opened to increase the pressure in the wheel cylinder W1, W2, W3, or W4.

When the second electromagnetic force is formed in the armature 110, the first opening/closing path P1 and the second opening/closing path P2 may be closed to maintain the pressure in the wheel cylinder W1, W2, W3, or W4.

When the third electromagnetic force is formed in the armature 110, the first opening/closing path P1 may be opened and the second opening/closing path P2 may be closed to reduce the pressure in the wheel cylinder W1, W2, W3, or W4.

As described above, according to the present embodiment, a 3-way solenoid valve and a vehicle braking system including the same utilize a solenoid valve structure that constitutes three-way fluid ports and a sealing part serving as a check valve, which minimizes the number of internal valves for the vehicle braking system, resulting in a more lightweight and more compact vehicle braking system and a lower production cost.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A 3-way solenoid valve, comprising:
a valve block including a valve chamber, a first fluid port, a second fluid port, and a third fluid port, wherein the first fluid port, the second fluid port and the third fluid port are in fluid communication with the valve chamber;
an armature disposed over and vertically spaced apart from the valve block and configured to produce an electromagnetic force in response to a current supplied thereto;
a plunger having a top end in contact with a bottom portion of the armature and configured to apply, in a direction from the top end to a bottom end of the plunger, a depressing force when applied with the electromagnetic force produced by the armature;
a body vertically disposed between the armature and the valve block and having an interior configured to allow at least a portion of the plunger to pass therethrough;

a sleeve disposed over and spaced apart from the valve block and comprising:

a first portion entirely surrounding the armature except for a bottom surface of the armature facing a top portion of the body; and a second portion extending downwardly from the first portion and laterally surrounding the top portion of the body; and a flow path control assembly disposed below the body and including:

a first opening/closing path configured to block or supply a first fluid flow between the first fluid port and the second fluid port;

a second opening/closing path configured to supply or block a second fluid flow between the second fluid port and the third fluid port;

a first elastic part disposed below the plunger and configured to provide an elastic force in a direction of the depressing force and regulate opening and closing of the first opening/closing path and the second opening/closing path according to a magnitude of the depressing force of the plunger;

a first flow control part disposed between the bottom end of the plunger and a top end of the first elastic part and configured to open and close the first opening/closing path; and a second flow control part disposed below a bottom end of the first elastic part and configured to open or close the second opening/closing path.

2. The 3-way solenoid valve of claim 1, wherein the flow path control assembly further comprises a valve seat disposed at a lower end of the second flow control part and having a hollow through which fluid flows.

3. The 3-way solenoid valve of claim 1, wherein:

the first flow control part has an upper end in contact with the bottom end of the plunger, and the plunger is configured to depress the first flow control part to apply the depressing force to the first elastic part.

4. The 3-way solenoid valve of claim 1, wherein:

the armature is configured to produce one of a plurality of electromagnetic forces at a time, the plurality of electromagnetic forces including a first electromagnetic force, a second electromagnetic force greater than the first electromagnetic force, and a third electromagnetic force greater than the second electromagnetic force, and the opening and closing of the first opening/closing path and the second opening/closing path are regulated by the flow path control assembly according to the magnitude of the depressing force generated by the plunger based on the first, second or third electromagnetic force applied to the plunger.

5. The 3-way solenoid valve of claim 4, wherein the flow path control assembly is configured, when the plunger is applied with the first electromagnetic force, to close the first opening/closing path and open the second opening/closing path.

6. The 3-way solenoid valve of claim 4, wherein the flow path control assembly is configured, when the plunger is applied with the second electromagnetic force, to close the first opening/closing path and the second opening/closing path.

7. The 3-way solenoid valve of claim 4, wherein the flow path control assembly is configured, when the plunger is applied with the third electromagnetic force, to open the first opening/closing path and close the second opening/closing path.

8. The 3-way solenoid valve of claim 1, wherein the flow path control assembly is configured, when the plunger is not applied with the electromagnetic force, configured to leave the opening and closing of the second opening/closing path to be regulated by a pressure difference between the first fluid port and the second and third fluid ports.

9. The 3-way solenoid valve of claim 1, wherein a fluid amount flowing through the first fluid port, the second fluid port, and the third fluid port continuously change according to the electromagnetic force produced by the armature and applied to the plunger.

10. The 3-way solenoid valve of claim 1, further comprising a check valve configured to allow fluid to flow exclusively from the second fluid port to the third fluid port.

11. A brake system for a vehicle, comprising:

a wheel cylinder configured to apply, using a hydraulic pressure, a braking pressure to a wheel of a vehicle;

the 3-way solenoid valve of claim 1 configured to increase or decrease the hydraulic pressure supplied to the wheel cylinder; and a braking device configured to supply, using a stepping force applied to a brake pedal or driving of a hydraulic pump, the hydraulic pressure to the wheel cylinder.

12. A method of operating the 3-way solenoid valve of claim 1 to control a fluid flow in a vehicle among a pressurizing device, a wheel cylinder, and an accumulator or reservoir, the method comprising:

determining whether there is a need to maintain, increase or decrease a pressure in the wheel cylinder;

producing, using an armature in the 3-way solenoid valve, an electromagnetic force to control the pressure in the wheel cylinder; and regulating (i) opening and closing of the first opening/closing path that regulates the first fluid flow between the accumulator or reservoir and the wheel cylinder, and (ii) opening and closing of the second opening/closing path that regulates the second fluid flow between the wheel cylinder and the pressurizing device according to the electromagnetic force produced by the armature.

13. The method of claim 12, wherein:

producing the electromagnetic force comprises producing, using the armature, a first electromagnetic force, a second electromagnetic force greater than the first electromagnetic force, and a third electromagnetic force greater than the second electromagnetic force, and regulating the opening and closing of the first opening/closing path and the second opening/closing path is performed according to the electromagnetic force produced by the armature.

14. The method of claim 13, wherein:

producing the electromagnetic force comprises producing, using the armature, the first electromagnetic force upon determining that there is a need to increase the pressure in the wheel cylinder, and regulating the opening and closing of the first and second opening/closing paths comprises closing the first opening/closing path and opening the second opening/closing path upon determining that there is a need to increase the pressure in the wheel cylinder.

15. The method of claim 13, wherein:

producing the electromagnetic force comprises producing, using the armature, the second electromagnetic force upon determining that there is a need to maintain the pressure in the wheel cylinder, and regulating the opening and closing of the first and second opening/closing paths comprises closing the first and second opening/closing paths upon determining that there is a need to maintain the pressure in the wheel cylinder.

16. The method of claim 13, wherein:

producing the electromagnetic force comprises producing, using the armature, the third electromagnetic force upon determining that there is a need to decrease the pressure in the wheel cylinder, and regulating the opening and closing of the first and second opening/closing paths comprises opening the first opening/closing path and closing the second opening/closing path upon determining that there is a need to decrease the pressure in the wheel cylinder.

17. The method of claim 14, wherein producing the electromagnetic force comprises linearly reducing the first electromagnetic force to linearly increase the pressure in the wheel cylinder.

* * * * *